US011901614B2

(12) United States Patent
Milyakh et al.

(10) Patent No.: US 11,901,614 B2
(45) Date of Patent: Feb. 13, 2024

(54) LOW LOSS WIDEBAND RADIATOR FOR BASE STATION ANTENNA

(71) Applicant: ACE TECHNOLOGIES CORPORATION, Incheon (KR)

(72) Inventors: Yaroslav Milyakh, Incheon (KR); Ilnar Battalov, Incheon (KR); Muhammad Usman Memon, Seoul (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 334 days.

(21) Appl. No.: 17/477,364

(22) Filed: Sep. 16, 2021

(65) Prior Publication Data

US 2022/0094065 A1 Mar. 24, 2022

(30) Foreign Application Priority Data

Sep. 21, 2020 (KR) ........................ 10-2020-0121424

(51) Int. Cl.

*H01Q 1/24* (2006.01)
*H01Q 5/25* (2015.01)
*H01Q 5/48* (2015.01)
*H01Q 9/44* (2006.01)
*H01Q 9/28* (2006.01)

(Continued)

(52) U.S. Cl.

CPC ............... *H01Q 1/246* (2013.01); *H01Q 5/25* (2015.01); *H01Q 5/48* (2015.01); *H01Q 9/285* (2013.01); *H01Q 9/44* (2013.01); *H01Q 21/26* (2013.01); *H01Q 21/062* (2013.01)

(58) Field of Classification Search

CPC ............ H01Q 1/246; H01Q 5/48; H01Q 9/44; H01Q 9/285; H01Q 21/062; H01Q 21/26

See application file for complete search history.

(56) References Cited

U.S. PATENT DOCUMENTS 4,686,536 A * 8/1987 Allcock ................. H01Q 9/065 343/797

6,072,439 A * 6/2000 Ippolito ................. H01Q 1/246 343/797

(Continued)

FOREIGN PATENT DOCUMENTS

CN 111710972 A * 9/2020

CN 112216972 A * 1/2021 ............... H01Q 1/38

(Continued)

*Primary Examiner* — Ab Salam Alkassim, Jr.

(57) ABSTRACT

A radiator includes a radiation substrate on which a dipole radiator configured to radiate a signal having a polarization of +45° and a signal having a polarization of −45° is formed, a first transmission line substrate vertically coupled to the radiation substrate and having a first transmission line and a second transmission line, formed thereon, a second transmission line substrate that is vertically coupled to the radiation substrate, is spaced parallel to the first transmission line substrate, and has a third transmission line, and a fourth transmission line, formed thereon, and a distribution circuit board vertically coupled to the first transmission line substrate and the second transmission line substrate and configured to provide the signal having a polarization of +45° and the signal having a polarization of −45° to the first to fourth transmission lines.

9 Claims, 6 Drawing Sheets

(51) Int. Cl.
*H01Q 21/26* (2006.01)
*H01Q 21/06* (2006.01)

(56) References Cited

U.S. PATENT DOCUMENTS 9,306,262 B2* 4/2016 Puzella .................... H01Q 9/28
10,978,813 B2* 4/2021 Yang .................... H01Q 25/001
11,563,278 B2* 1/2023 Tang ...................... H01Q 1/521
11,777,229 B2* 10/2023 Li .......................... H01Q 5/307 343/797
2007/0241983 A1* 10/2007 Cao ........................ H01Q 21/26 343/797
2012/0112967 A1* 5/2012 Coupez ................ H01Q 21/062 343/700 MS
2014/0184464 A1* 7/2014 Ilnar ...................... H01Q 21/26 343/835
2015/0048988 A1* 2/2015 Battarov ................ H01Q 21/26 343/797
2017/0244159 A1* 8/2017 Moon ...................... H01Q 5/42
2017/0288312 A1* 10/2017 Koskiniemi ............. H01Q 1/48
2019/0280377 A1* 9/2019 Zhang .................... H01Q 1/523
2020/0127389 A1* 4/2020 Li .......................... H01Q 5/378
2020/0243972 A1* 7/2020 Tang ........................ H01Q 5/40
2020/0321712 A1* 10/2020 Seo ........................ H01Q 21/26
2021/0111497 A1* 4/2021 An ....................... H04B 1/0064
2021/0175639 A1* 6/2021 Wang ................. H01Q 21/0075
2022/0052442 A1* 2/2022 Varnoosfaderani .......................... H01Q 21/065
2022/0190470 A1* 6/2022 Wu ........................ H01Q 21/24
2022/0190487 A1* 6/2022 Sun ........................ H01Q 21/08
2022/0263248 A1* 8/2022 Tang ...................... H01Q 9/285
2022/0352649 A1* 11/2022 Wu .......................... H01Q 1/52
2022/0416406 A1* 12/2022 Varnoosfaderani .... H01Q 1/246
2023/0071050 A1* 3/2023 Sun .......................... H01Q 5/42
2023/0163486 A1* 5/2023 Varnoosfaderani .......................... H01Q 25/001 343/797

FOREIGN PATENT DOCUMENTS

KR 10-1213188 B 12/2012
WO 2019070947 A1 4/2019
WO WO-2022225245 A1 * 10/2022

* cited by examiner

LOW LOSS WIDEBAND RADIATOR FOR BASE STATION ANTENNA

CROSS-REFERENCE TO RELATED APPLICATION

This application claims priority under 35 U.S.C. 119(a) to and the benefit of Korean Patent Application No. 2020-0121424 filed on Sep. 21, 2020, the disclosure of which is incorporated herein by reference in its entirety.

BACKGROUND

1. Field of the Invention

The present disclosure relates to a radiator for a base station antenna, and more particularly, to a low loss wideband radiator for a base station antenna.

2. Discussion of Related Art

A massive multiple-input multiple-output (MIMO) antenna used in a 5G communication system requires an increase in system capacity through active module integration and digital beamforming for each radiator. In particular, in order to achieve excellent MIMO characteristics, there is a need to increase a gain of each radiator and secure an excellent radiation pattern and a wide available band in a small physical area.

A radiator for a general base station antenna uses L-probe feeding for a low profile, and uses a method in which two substrates orthogonal to each other form a balun.

In a structure of such a conventional radiator, a polarized wave is formed using delay lines having a phase difference of 180°, so that a divider having a phase difference of 180° is required, and phase delay lines should be provided. However, a loss inevitably occurs due to the phase delay lines.

In addition, the phase delay lines have frequency-dependent characteristics, and thus appropriate wideband characteristics may not be secured.

SUMMARY

The present disclosure is directed to providing a radiator for a base station antenna capable of minimizing loss without requiring separate delay lines.

The present disclosure is also directed to providing a radiator for a base station antenna capable of achieving wideband characteristics.

According to an aspect of the present disclosure, there is provided a low loss wideband radiator for a base station antenna, the radiator including a radiation substrate on which a dipole radiator configured to radiate a signal having a polarization of +45° and a signal having a polarization of −45° is formed, a first transmission line substrate vertically coupled to the radiation substrate and having a first transmission line, through which the signal having a polarization of +45° is transmitted, and a second transmission line, through which the signal having a polarization of −45° is transmitted, formed thereon, a second transmission line substrate that is vertically coupled to the radiation substrate, is spaced parallel to the first transmission line substrate, and has a third transmission line, through which the signal having a polarization of +45° is transmitted, and a fourth transmission line, through which the signal having a polarization of −45° is transmitted, formed thereon, and a distribution circuit board vertically coupled to the first transmission line substrate and the second transmission line substrate and configured to provide the signal having a polarization of +45° and the signal having a polarization of −45° to the first to fourth transmission lines.

A first feed member and a second feed member, each of which is configured to feed the signal having a polarization of +45° in a coupling manner, and a third feed member and a fourth feed member, each of which is configured to feed the signal having a polarization of −45° in a coupling manner, may be formed on a lower portion of the radiation substrate.

The first feed member and the second feed member may be coupled to the first transmission line of the first transmission line substrate and the third transmission line of the second transmission line substrate, respectively.

The third feed member and the fourth feed member may be coupled to the second transmission line of the first transmission line substrate and the fourth transmission line of the second transmission line substrate, respectively.

A first substrate contact terminal coupled to the first transmission line and a second substrate contact terminal coupled to the second transmission line may be formed on the distribution circuit board, and the first substrate contact terminal and the second substrate contact terminal may be arranged in parallel in a row.

A third substrate contact terminal coupled to the third transmission line and a fourth substrate contact terminal coupled to the fourth transmission line may be formed on the distribution circuit board, and the third substrate contact terminal and the fourth substrate contact terminal may be arranged in parallel in a row.

A first input port electrically connected to the first substrate contact terminal and to which the signal having a polarization of +45° is input, a second input port electrically connected to the third substrate contact terminal and to which the signal having a polarization of +45° is input, a third input port electrically connected to the second substrate contact terminal and to which the signal having a polarization of −45° is input, and a fourth input port electrically connected to the fourth substrate contact terminal and to which the signal having a polarization of −45° is input may be formed on the distribution circuit board.

The first input port and the second input port may be arranged in parallel in a row, and the third input port and the fourth input port may be arranged in parallel in a row.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
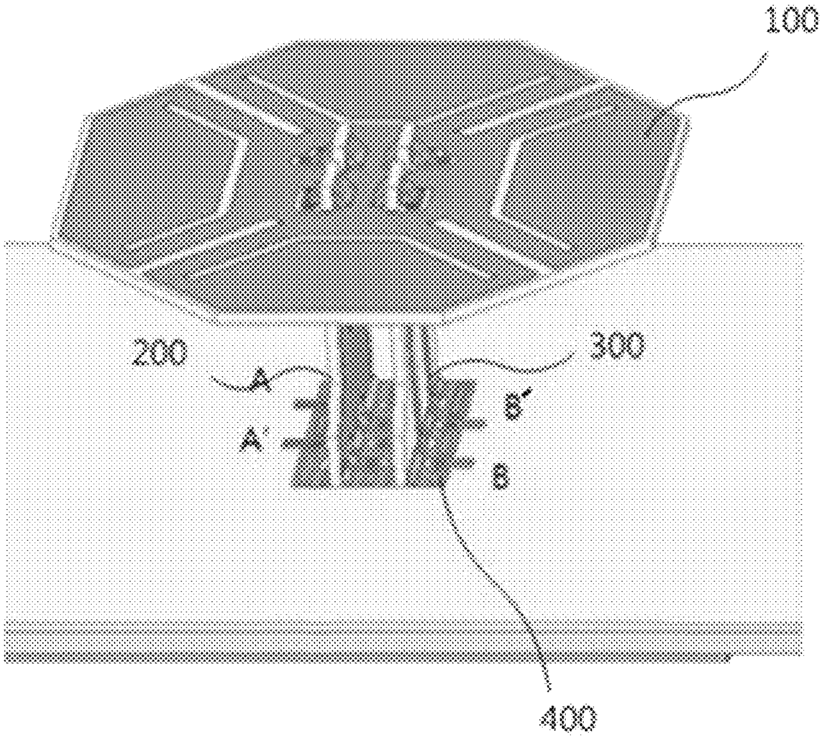
FIG. 1 is a perspective view illustrating an overall structure of a low loss wideband radiator for a base station antenna according to an embodiment of the present disclosure.

In order for the present disclosure and the operational advantages of the present disclosure and the objectives accomplished by the implementation of an embodiment of the present disclosure to be fully understood, reference should be made to the accompanying drawings illustrating an exemplary embodiment of the present disclosure and the contents described in the accompanying drawings.

Hereinafter, the present disclosure will be described in detail by describing the exemplary embodiment of the present disclosure with reference to the accompanying drawings. However, the present disclosure may be implemented in various different forms and is not limited to the embodiment described herein. In addition, parts irrelevant to the description will be omitted in the drawings in order to clearly explain the embodiment of the present disclosure, and the same reference numerals in the drawings denote the same members.

Throughout the specification, when a certain part "includes" a certain component, other components are not excluded from being included unless otherwise stated, and other components may be further included. Further, terms described in the specification such as "unit," "portion," "module," "block," or the like may refer to a unit of processing at least one function or operation, and this configuration may be implemented in hardware, software, or as a combination of hardware and software.

FIG. 1 is a perspective view illustrating an overall structure of a low loss wideband radiator for a base station antenna according to an embodiment of the present disclosure.

The radiator shown in FIG. 1 is disposed in a base station antenna while forming an arrangement structure, and the present disclosure relates to a structure of the radiator installed in the base station antenna.

The base station antenna needs to form a beam in a specific direction. The structure employed to form a beam in a desired direction is an arrangement structure of a radiator.

Meanwhile, the radiator of the base station antenna is required to radiate dual polarized signals. For example, a characteristic of being able to simultaneously radiate a signal having a polarization of +45° and a signal having a polarization of −45° is required. As described above, in order to radiate the dual polarized signals, two types of polarized signals are fed to the radiator for a base station antenna.

Referring to FIG. 1, a radiator capable of radiating dual polarized signals of the present disclosure includes a radiation substrate 100, a first transmission line substrate 200, a second transmission line substrate 300, and a distribution circuit board 400.

The radiation substrate 100 is a substrate in which a plurality of dipole radiators for dual polarization radiation are formed, and the radiation substrate 100 is located at an uppermost portion of the radiator. The plurality of dipole radiators may be formed on an upper surface of the radiation substrate 100, and a feed part configured to feed the plurality of dipole radiators is formed on a lower surface of the radiation substrate 100.

The first transmission line substrate 200 and the second transmission line substrate 300 are substrates in which transmission lines for providing feed signals to the radiators of the radiation substrate are formed. The first transmission line substrate 200 and the second transmission line substrate 300 are vertically formed with respect to the radiation substrate 100 and the distribution circuit board 400, and serve as supporters configured to support the radiation substrate 100.

According to the exemplary embodiment of the present disclosure, the first transmission line substrate 200 and the second transmission line substrate 300 have the same structure. Each of the first transmission line substrate 200 and the second transmission line substrate 300 includes an upper surface, on which metal patterns through which signals are transmitted are formed, and a lower surface on which a ground plane is formed, thereby having a microstrip line structure. However, this is merely one embodiment, and it will be apparent to those skilled in the art that other types of transmission lines may also be implemented.

The distribution circuit board 400 serves to provide feed signals to each transmission line formed on the transmission line substrates. The distribution circuit board forms a circuit to provide a signal having a polarization of +45° and a signal having a polarization of −45° to the transmission lines in fixed positions.

Two feed points for the signal having a polarization of +45° and two feed points for the signal having a polarization of −45° are formed on the distribution circuit board 400, and a detailed structure thereof will be described with reference to separate drawings.

In present disclosure, A is +signal of polarization of +45°, A' is −signal of polarization of +45°, B is +signal of polarization of −45°, and B' is −signal of polarization of −45°.

Figure 2:
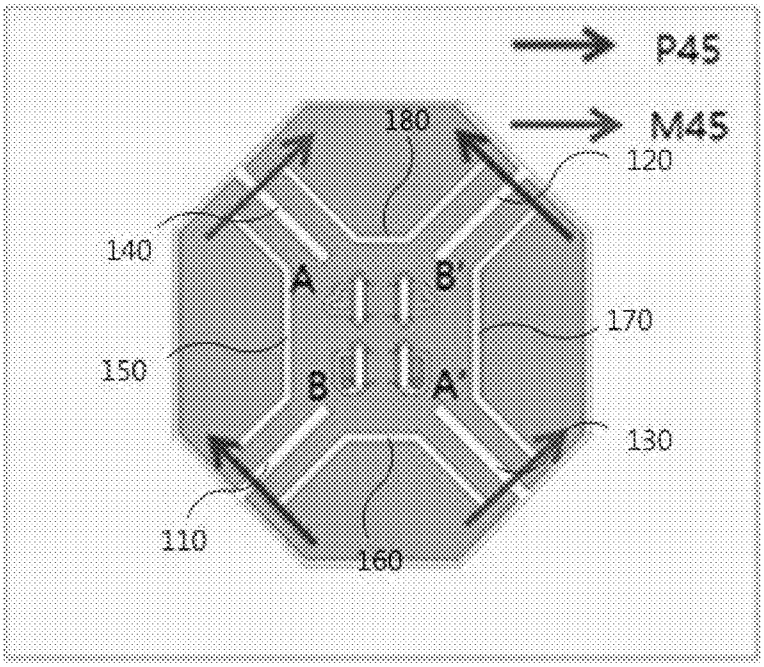
FIG. 2 is a view illustrating an upper surface of a radiation substrate in the low loss wideband radiator according to an embodiment of the present disclosure.

FIG. 2 is a view illustrating the upper surface of the radiation substrate in the low loss wideband radiator according to one embodiment of the present disclosure.

Referring to FIG. 2, the radiation substrate according to one embodiment of the present disclosure includes a radiator formed thereon, and the radiator has a structure in which four dipole radiators are electrically connected.

Four main slots 110, 120, 130, and 140 are formed in the radiator so that the four dipole radiators are implemented. A first main slot 110 and a second main slot 120 are formed in a direction of −45°, and a third main slot 130 and a fourth main slot 140 are formed in a direction of +45°. According to the exemplary embodiment of the present disclosure, the main slots are each formed in a straight-line shape. The four dipole radiators are defined by each of the main slots 110, 120, 130, and 140.

Sub-slots 150, 160, 170, and 180 are respectively formed on both sides of the main slots. A first sub-slot 150 is formed between the first main slot 110 and the fourth main slot 140, a second sub-slot 160 is formed between the first main slot 110 and the third main slot 130, a third sub-slot 170 is formed between the third main slot 130 and the second main slot 120, and a fourth sub-slot 180 is formed between the second main slot 120 and the fourth main slot 140. According to the exemplary embodiment of the present disclosure, a portion of the sub-slot is formed at an angle of +45°, and another portion thereof is formed at an angle of −45°. For example, in the case of the first sub-slot, a portion adjacent to the first main slot 110 is formed at an angle of −45°, which is the same angle as the first main slot 110, and another portion adjacent to the fourth main slot 140 is formed at an angle of +45°, which is the same angle as the fourth main slot 140.

The signal having a polarization of +45° is generated through the dipole radiators defined by the first main slot 110 and the second main slot 120. The signal having a polarization of −45° is generated through the dipole radiators defined by the third main slot 130 and the fourth main slot 140.

Feeding to each dipole radiator is performed by a coupling method, and a feeding structure is formed on a lower portion of the radiation substrate 100.

In FIG. 2, P45 is polarization direction of +45° polarization, and M45 is polarization direction of −45° polarization.

Figure 3:
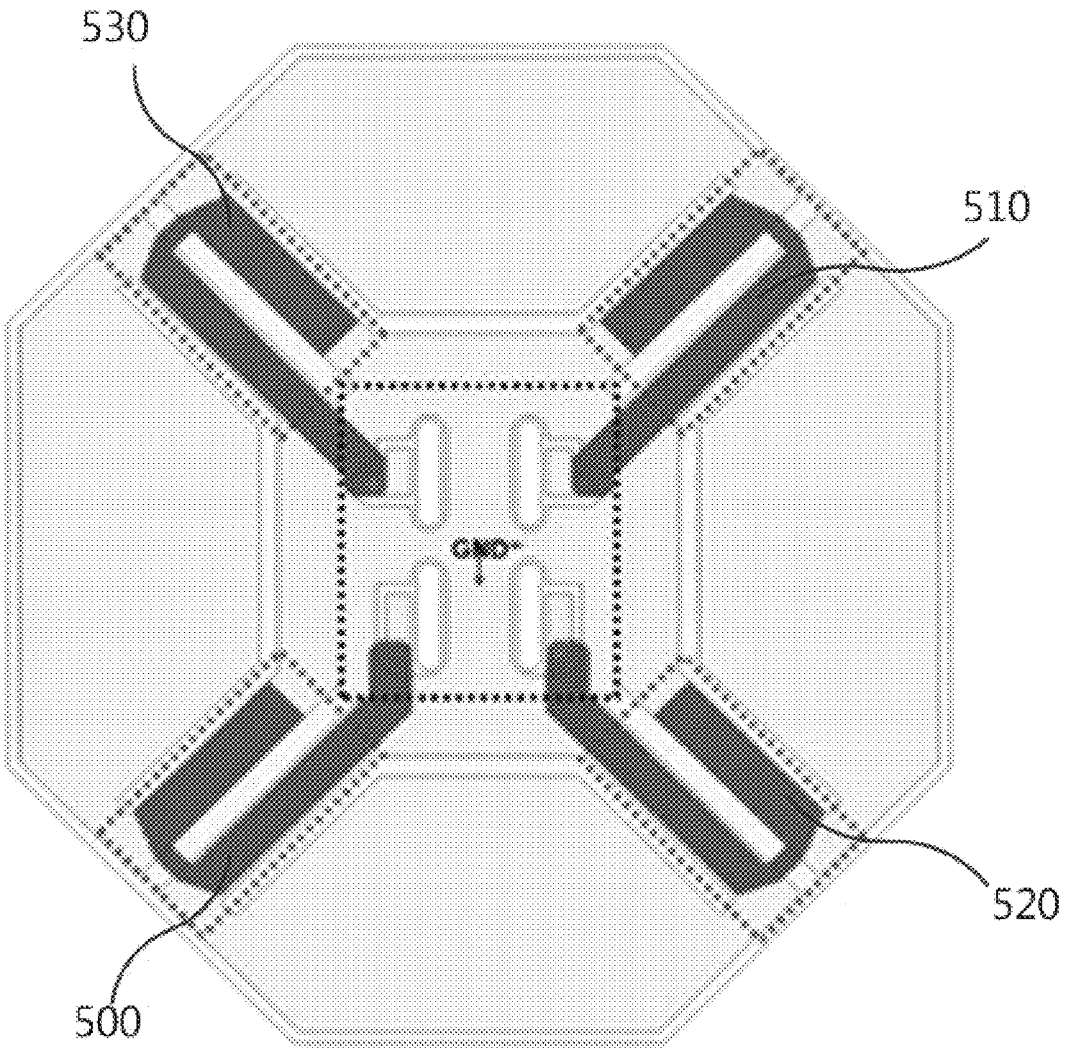
FIG. 3 is a view illustrating a lower surface of the radiation substrate in the low loss wideband radiator according to an embodiment of the present disclosure.
Figure 4:
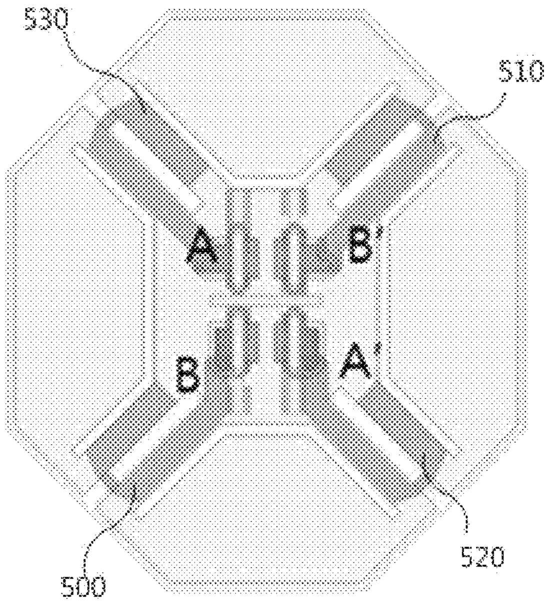
FIG. 4 is a perspective view of upper and lower portions of the low loss wideband radiator according to an embodiment of the present disclosure.

FIG. 3 is a view illustrating the lower surface of the radiation substrate in the low loss wideband radiator according to an embodiment of the present disclosure, and FIG. 4 is a perspective view of upper and lower portions of the low loss wideband radiator according to an embodiment of the present disclosure.

Referring to FIGS. 3 and 4, four feed members 500, 510, 520, and 530 are coupled to the lower portion of the radiation substrate 100. The feed members 500, 510, 520, and 530 may each made of a metal material, and each of the feed members 500, 510, 520, and 530 may have a U-shape.

A feed signal is independently provided to each of the feed members 500, 510, 520, and 530, and the feed members 500, 510, 520, and 530 are electrically spaced apart from each other.

The plurality of feed members 500, 510, 520, and 530 are disposed to respectively correspond to positions of the main slots 110, 120, 130, and 140 formed on the upper portion of the substrate. A first feed member 500 is disposed below the first main slot 110, a second feed member 510 is disposed below the second main slot 120, a third feed member 520 is disposed below the third main slot 130, and a fourth feed member 530 is disposed below the fourth main slot 140.

The first feed member 500 and the second feed member 510 receive the signal having a polarization of +45° to provide a feed signal to the first main slot 110 and the second main slot 120, and the third feed member 520 and the fourth feed member 530 receive the signal having a polarization of −45° to provide a feed signal to the third main slot 130 and the fourth main slot 140.

In a radiator of a general multiple-polarization base station antenna, a feed member is installed in a vertically formed balun part. However, in the present disclosure, the feed member is installed on the lower portion of the substrate on which the dipole radiators are formed.

Figure 5:
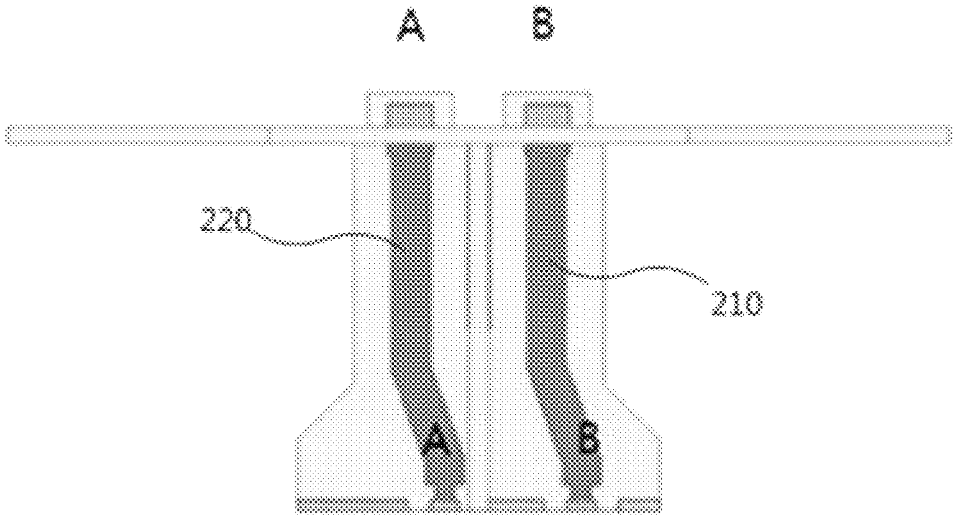
FIG. 5 is a front view of a first transmission line substrate of the radiator for a base station antenna according to an embodiment of the present disclosure.

FIG. 5 is a front view of the first transmission line substrate of the radiator for a base station antenna according to an embodiment of the present disclosure.

Referring to FIG. 5, two transmission lines are formed on the first transmission line substrate according to an embodiment of the present disclosure.

Two transmission lines 210 and 220 are formed on the upper surface of the first transmission line substrate 200. A first transmission line 210 is a transmission line for transmitting the signal having a polarization of +45°, and a second transmission line 220 is a transmission line for transmitting the signal having a polarization of −45°.

The first transmission line 210 is electrically coupled to the first feed member 500 to provide the signal having a polarization of +45° to the first feed member 500.

The second transmission line 220 is electrically coupled to the fourth feed member 530 to provide the signal having a polarization of −45° to the fourth feed member 530.

Although only the upper surface of the first transmission line substrate 200 is illustrated in FIG. 5, a ground plane is formed on the lower surface of the first transmission line substrate 200, and the first transmission line 210 and the second transmission line 220 interact with the ground plane so that a radio frequency (RF) signal is transmitted therethrough in a microstrip form.

Figure 6:
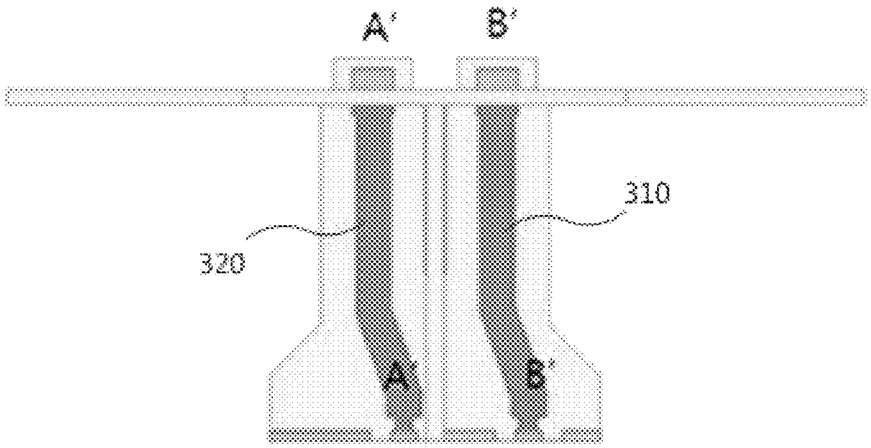
FIG. 6 is a front view of a second transmission line substrate of the radiator for a base station antenna according to an embodiment of the present disclosure.

FIG. 6 is a front view of the second transmission line substrate of the radiator for a base station antenna according to one embodiment of the present disclosure.

Referring to FIG. 6, two transmission lines are also formed on the second transmission line substrate 300 according to an embodiment of the present disclosure.

A third transmission line 310 and a fourth transmission line 320 are formed on the upper surface of the second transmission line substrate 300.

The third transmission line 310 is a transmission line for transmitting the signal having a polarization of +45°, and the fourth transmission line 320 is a transmission line for transmitting the signal having a polarization of −45°.

The third transmission line 310 is electrically coupled to the second feed member 510 to provide the signal having a polarization of +45° to the second feed member 510.

The fourth transmission line 320 is electrically coupled to the third feed member 520 to provide the signal having a polarization of −45° to the third feed member 520.

A ground plane is also formed on the lower surface of the second transmission line substrate 300 so that an RF signal may be transmitted in a microstrip method.

According to the present disclosure, feed signals are provided through two transmission line substrates formed perpendicular to the radiation substrate 100, and this structure may allow signals to be provided with a low loss as compared with a conventional structure using a vertically intersecting balun.

As described above, a transmission line for the signal having a polarization of +45° and a transmission line for the signal having a polarization of −45° are formed on one transmission line substrate. In such a structure, the signal having a polarization of +45° is provided to each of the first transmission line substrate 200 and the second transmission line substrate 300, and the signal having a polarization of −45° is also provided to each of the first transmission line substrate 200 and the second transmission line substrate 300.

The signal having a polarization of +45° provided to each transmission line substrate is a signal split from the same signal, and the signal having a polarization of −45° is also a signal split from the same signal.

That is, the signal having a polarization of +45° should be provided through different transmission line substrates, and in order to provide the signal having a polarization of +45° of the same phase to the different transmission line substrates, a circuit structure becomes complicated, and this problem equally occurs for the signal having a polarization of −45°.

In the present disclosure, a distribution circuit board is provided so that different polarized signals may be provided to each transmission line substrate, and hereinafter, a structure of the distribution circuit board will be described.

Figure 7:
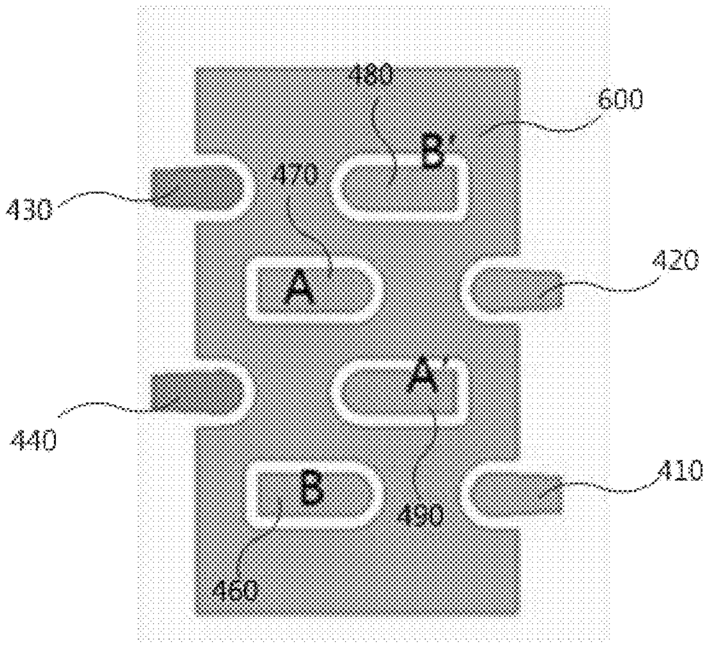
FIG. 7 is a view illustrating an upper surface of a distribution circuit board of the radiator for a base station antenna according to an embodiment of the present disclosure.

FIG. 7 is a view illustrating an upper surface of the distribution circuit board of the radiator for a base station antenna according to an embodiment of the present disclosure.

Referring to FIG. 7, the distribution circuit board 400 according to an embodiment of the present disclosure includes four input ports 410, 420, 430, and 440. The signal having a polarization of +45° is input to a first input port 410 and a second input port 420, and the signal having a polarization of −45° is input to a third input port 430 and a fourth input port 440.

One signal having a polarization of +45° is split and input to the first input port 410 and the second input port 420. One signal having a polarization of −45° is split and input to the third input port 430 and the fourth input port 440.

The first input port 410 and the second input port 420 are arranged in parallel in a row so that the signal having a polarization of +45° may be split into signals having the same phase, and the third input port 430 and the fourth input port 440 are also arranged in parallel in a row so that the signal having a polarization of −45° may be split into signals having the same phase.

Since transmission lines for different polarized signals are formed on the transmission line substrates 200 and 300, the transmission line substrates may not be directly connected to the input ports. For example, when the first transmission line substrate 200 is directly connected to the first input port 410 and the second input port 420, the same polarized signal is inevitably provided through the transmission line substrate. This is because the transmission line substrates are formed to be parallel and perpendicular to each other without crossing each other as described above.

The transmission line substrates 200 and 300 are not connected to the input ports 410, 420, 430, and 440, and a first substrate contact terminal 460, a second substrate contact terminal 470, a third substrate contact terminal 480, and a fourth substrate contact terminal 490 are formed on the distribution circuit board 400.

The first substrate contact terminal 460 and the second substrate contact terminal 470 are in electrical contact with the transmission lines 210 and 220 of the first transmission line substrate 200, respectively. The first substrate contact terminal 460 is in electrical contact with the first transmission line 210 for transmitting the signal having a polarization of +45°, and the second substrate contact terminal 470 is in electrical contact with the second transmission line 220 for transmitting the signal having a polarization of −45°.

The third substrate contact terminal 480 and the fourth substrate contact terminal 490 are electrically coupled to the transmission lines 310 and 320 of the second transmission line substrate 300, respectively. The third substrate contact terminal 480 is in electrical contact with the third transmission line 310 for transmitting the signal having a polarization of +45°, and the fourth substrate contact terminal 490 is in electrical contact with the fourth transmission line 320 for transmitting the signal having a polarization of −45°.

The first substrate contact terminal 460 and the second substrate contact terminal 470 are arranged in parallel in a row and coupled to the first transmission line substrate 200. The third substrate contact terminal 480 and the fourth substrate contact terminal 490 are also arranged in parallel in a row and coupled to the second transmission line substrate 300.

Meanwhile, a region excluding the input ports 410, 420, 430, and 440 and the substrate contact terminals 460, 470, 480, and 490 is a ground plane 600.

Figure 8:
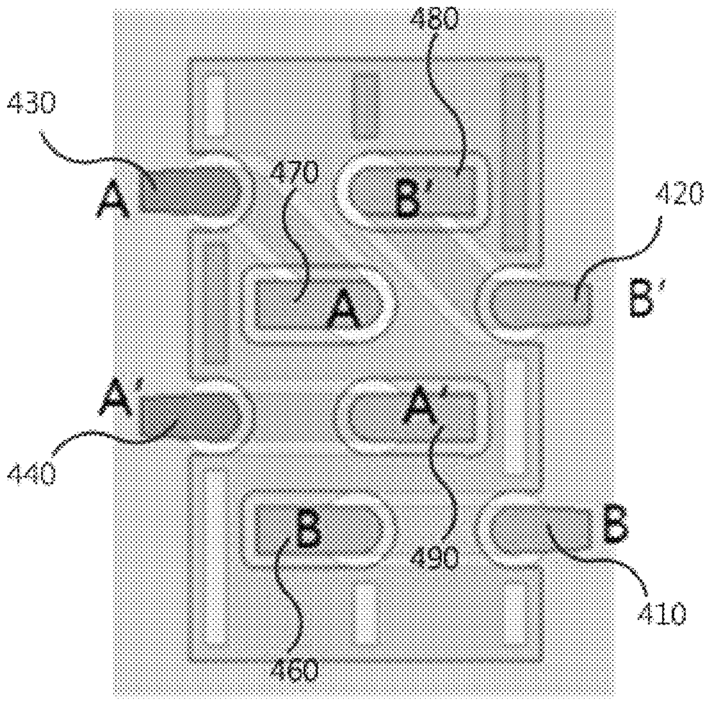
FIG. 8 is a view illustrating a lower surface of the distribution circuit board of the radiator for a base station antenna according to an embodiment of the present disclosure.

FIG. 8 is a perspective view illustrating a lower surface of the distribution circuit board of the radiator for a base station antenna according to an embodiment of the present disclosure.

The input ports 410, 420, 430, and 440 are electrically separated from the substrate contact terminals 460, 470, 480, and 490, respectively, in an upper portion of the distribution circuit board 400 and are electrically connected to the substrate contact terminals 460, 470, 480, and 490, respectively, in a lower portion of the distribution circuit board 400.

Referring to FIG. 8, the first input port 410 is electrically connected to the first substrate contact terminal 460 and has a structure capable of transmitting an RF signal using the ground plane 600 formed on the upper portion of the substrate.

The second substrate contact terminal 470 arranged in parallel in a row with the first substrate contact terminal 460 is electrically connected to the third input port 430.

The second input port 420 is electrically connected to the third substrate contact terminal 480, and the fourth input port 440 is electrically connected to the fourth substrate contact terminal 490.

Through the connection structure in the lower portion of the substrate as shown in FIG. 8, the first substrate contact terminal 460 for the signal having a polarization of +45° and the second substrate contact terminal 470 for the signal having a polarization of −45° may be arranged in parallel in a row, and the third substrate contact terminal 480 for the signal having a polarization of +45° and the fourth substrate contact terminal 490 for the signal having a polarization of −45° may be arranged in parallel in a row.

A radiator for a base station antenna of the present disclosure has an advantage of minimizing loss without requiring separate delay lines.

A radiator for a base station antenna according to the present disclosure has an advantage of achieving wideband characteristics.

The present disclosure has been described with reference to the embodiment illustrated in the drawings, but this is only exemplary. It will be understood by those skilled in the art that various modifications and equivalent other embodiments may be made.

Accordingly, the scope of the present disclosure to be protected should be determined by the technical scope defined in the appended claims.

What is claimed is:

1. A low loss wideband radiator for a base station antenna, the radiator comprising:

a radiation substrate on which a dipole radiator configured to radiate a signal having a polarization of +45° and a signal having a polarization of −45° is formed;

a first transmission line substrate vertically coupled to the radiation substrate and having a first transmission line, through which the signal having a polarization of +45° is transmitted, and a second transmission line, through which the signal having a polarization of −45° is transmitted, formed thereon;

a second transmission line substrate that is vertically coupled to the radiation substrate, is spaced parallel to the first transmission line substrate, and has a third transmission line, through which the signal having a polarization of +45° is transmitted, and a fourth transmission line, through which the signal having a polarization of −45° is transmitted, formed thereon; and a distribution circuit board vertically coupled to the first transmission line substrate and the second transmission line substrate and configured to provide the signal having a polarization of +45° and the signal having a polarization of −45° to the first to fourth transmission lines.

2. The radiator of claim 1, wherein a first feed member and a second feed member, each of which is configured to feed the signal having a polarization of +45° in a coupling manner, and a third feed member and a fourth feed member, each of which is configured to feed the signal having a polarization of −45° in a coupling manner, are formed on a lower portion of the radiation substrate.

3. The radiator of claim 2, wherein the first feed member and the second feed member are coupled to the first transmission line of the first transmission line substrate and the third transmission line of the second transmission line substrate, respectively.

4. The radiator of claim 3, wherein the third feed member and the fourth feed member are coupled to the second transmission line of the first transmission line substrate and the fourth transmission line of the second transmission line substrate, respectively.

5. The radiator of claim 1, wherein a first substrate contact terminal coupled to the first transmission line and a second substrate contact terminal coupled to the second transmission line are formed on the distribution circuit board, and the first substrate contact terminal and the second substrate contact terminal are arranged in parallel in a row.

6. The radiator of claim 5, wherein a third substrate contact terminal coupled to the third transmission line and a fourth substrate contact terminal coupled to the fourth transmission line are formed on the distribution circuit board, and the third substrate contact terminal and the fourth substrate contact terminal are arranged in parallel in a row.

7. The radiator of claim 6, wherein a first input port electrically connected to the first substrate contact terminal and to which the signal having a polarization of +45° is input, a second input port electrically connected to the third substrate contact terminal and to which the signal having a polarization of +45° is input, a third input port electrically connected to the second substrate contact terminal and to which the signal having a polarization of −45° is input, and a fourth input port electrically connected to the fourth substrate contact terminal and to which the signal having a polarization of −45° is input are formed on the distribution circuit board.

8. The radiator of claim 7, wherein the first input port and the second input port are arranged in parallel in a row, and the third input port and the fourth input port are arranged in parallel in a row.

9. The radiator of claim 8, wherein one signal having a polarization of +45° is split and input to the first input port and the second input port, and one signal having a polarization of −45° is split and input to the third input port and the fourth input port.

* * * * *